(12) United States Patent
Post et al.

(10) Patent No.: US 12,298,253 B2
(45) Date of Patent: May 13, 2025

(54) VISUAL INSPECTION SYSTEMS AND METHODS

(71) Applicant: Essex Furukawa Magnet Wire USA LLC, Atlanta, GA (US)

(72) Inventors: Russell Glenn Post, Fort Wayne, IN (US); Daniel Alonso Prieto Jurado, Fort Wayne, IN (US)

(73) Assignee: Essex Solutions USA LLC, Atlanta, GA (US)

( * ) Notice: Subject to any disclaimer, the term of this patent is extended or adjusted under 35 U.S.C. 154(b) by 50 days.

(21) Appl. No.: 18/110,409

(22) Filed: Feb. 16, 2023

(65) Prior Publication Data
US 2024/0280499 A1    Aug. 22, 2024

(51) Int. Cl.
| | |
|---|---|
| G01N 21/88 | (2006.01) |
| G01N 21/952 | (2006.01) |
| H04N 23/56 | (2023.01) |
| H04N 23/90 | (2023.01) |

(52) U.S. Cl.
CPC ....... *G01N 21/8806* (2013.01); *G01N 21/952* (2013.01); *H04N 23/56* (2023.01); *H04N 23/90* (2023.01); *G01N 2021/8812* (2013.01)

(58) Field of Classification Search
CPC .......... G01N 21/8806; G01N 21/952; G01N 2021/8812; H04N 23/56; H04N 23/90
See application file for complete search history.

(56) References Cited

U.S. PATENT DOCUMENTS

| | | | | |
|---|---|---|---|---|
| 10,184,858 B2 * | 1/2019 | Klein | ................... | G01N 21/896 |
| 2005/0220335 A1 | 10/2005 | Budd | | |
| 2006/0119864 A1 | 6/2006 | Lindner et al. | | |
| 2008/0063426 A1 * | 3/2008 | Chang | ................... | G01N 21/952 |
| | | | | 399/98 |
| 2020/0049942 A1 * | 2/2020 | Gisler | ................... | G02B 27/143 |
| 2021/0302324 A1 | 9/2021 | Yoon | | |

FOREIGN PATENT DOCUMENTS

| | | | | |
|---|---|---|---|---|
| CA | 3134342 A1 * | 3/2013 | ......... | G01N 15/1429 |
| CN | 114981033 A * | 8/2022 | ........... | B23K 26/032 |
| JP | 2011106909 A * | 6/2011 | | |
| JP | 2011203200 A * | 10/2011 | | |
| JP | 2012013509 A * | 1/2012 | | |
| KR | 20050063459 A * | 6/2005 | | |

OTHER PUBLICATIONS

International Search Report and Written Opinion in PCT/US2024/016047. Mailed May 22, 2024. 7 pages.

* cited by examiner

*Primary Examiner* — Michael Lee (57) ABSTRACT

A visual inspection system that may be utilized to inspect and identify defects in magnet wire or other objects is described. The system may include an outer housing, a light source, and at least one visual inspection device. The housing may include a channel through which an object to be inspected is traversed, and the channel may extend along a longitudinal direction and include an inner surface having a diameter that narrows along the longitudinal direction between a first point and an examination area. The light source may be positioned on an opposite side of the first point from the examination area along the longitudinal direction. The visual inspection device(s) may be positioned around an outer circumference of the examination area, and each visual inspection device may be configured to inspect the object through a respective opening in the housing.

21 Claims, 6 Drawing Sheets

VISUAL INSPECTION SYSTEMS AND METHODS

TECHNICAL FIELD

Embodiments of the disclosure relate generally to systems and methods for visually inspecting and detecting defects in objects, and more particularly, to systems and methods for the contactless and inline visual inspection and detection of defects in magnet wire and other objects.

BACKGROUND

Visual inspection is utilized to examine and identify defects in a wide variety of different objects and products, such as magnet wire, cable, etc. Visual inspection systems and devices typically include one or more cameras configured to inspect an object and compare captured images and data points to baseline or threshold values in order to detect or identify defects. In many cases, it is desirable to illuminate an object as it is visually inspected. However, conventional visual inspection systems typically use mirrors to deflect light to an area in which an object is examined. Deflection of light by mirrors and other conventional techniques often results in unwanted glare that can reduce the accuracy of detecting defects. As one example, unwanted glare from a light source may prevent accurate visual detection of insulation defects on magnet wire insulation. Accordingly, there is an opportunity for improved systems and methods for visually inspecting and detecting defects in objects. There is further an opportunity for improved systems and methods that facilitate contacting and inline visual inspection and defects in objects.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Certain embodiments of the present disclosure are directed to systems and devices for inline contactless visual inspection of an object in order to detect faults. In various embodiments, a visual inspection system or device may be utilized in conjunction with a wide variety of different types of objects that may be longitudinally fed or passed through the system, such as magnet wire, cable, conduit, tubing, etc. A visual inspection system or device may include an outer housing, at least one light source configured to illuminate an inspection area, and one or more visual inspection devices configured to inspect an object as it passes through the examination area. According to an aspect of the disclosure, the outer housing may include a channel through which an object to be inspected is traversed or fed. The channel may extend along a longitudinal direction and include an inner surface having a diameter that narrows along the longitudinal direction between a first point and the examination area. In certain embodiments, the inner surface of the channel may include a convex surface. Additionally, a light source may be positioned on an opposite side of the first point from the examination area, and the light source may emit light into the channel towards the examination area. The narrowing diameter of the channel may function to focus and/or reflect emitted light onto the object within the examination area, thereby facilitating enhanced examination by the one or more visual inspection devices. In certain embodiments, the inner surface of the channel may be a diffuse surface that functions to spread the light emitted by a light source.

A wide variety of suitable light sources may be utilized in various embodiments of the disclosure. For example, one or more ring lights may be utilized. In certain embodiments, one or more light emitting diode ("LED") ring lights may be utilized. Additionally, in certain embodiments, a single light source (e.g., a ring light, a plurality of lights proximate to one another, etc.) may be utilized. For example, light may be emitted into the channel towards the examination area from a single longitudinal end of the channel. In other embodiments, respective light sources (e.g., two respective ring lights, two groups of lights, etc.) may be utilized. For example, light may be emitted into the channel towards the examination area from opposite longitudinal ends of the channel. When two light sources are utilizes, the inner surface of the channel may have a diameter that narrows along the longitudinal direction in both longitudinal directions towards the examination area. For example, a first light source may be positioned on an opposite side of the first point from the examination area. The diameter of the inner surface may then further narrow between a second point and the examination area, and the second light source may be positioned on an opposite side of the second point from the examination area. In this regard, the respective light emitted by each light source may be focused and/or reflected onto the object with the examination area. Further, the diameter of the channel may narrow at a wide variety of suitable rates as desired in various embodiments. In certain embodiments, the diameter may narrow at an angle (or a combination of angles) along the longitudinal direction between approximately five degrees (5°) and approximately sixty-five degrees (65°).

A wide variety of suitable visual inspection devices may be utilized as desired in various embodiments. For example, one or more suitable cameras may be utilized as visual inspection devices. In certain embodiments, a plurality of cameras may be positioned at spaced locations along an outer circumference or outer periphery of the examination area. Each visual inspection device may be configured to examine or visually inspect an object as it passes through the examination area in order to detect or facilitate detection (e.g., through a software analysis of captured images or data)

of faults or defects on the object. In certain embodiments, a number of visual inspection devices that is utilized may be based at least in part on the dimensions of the object to be inspected. For example, four cameras may be utilized in order to examine an object having a rectangular cross-section.

As desired, the visual inspection system may include a wide variety of other suitable components. In certain embodiments, the system may include one or more wire guides (e.g., guide rollers, etc.) configured to position an object for examination within the examination area. In certain embodiments, one or more suitable mounting rails may facilitate positioning of the visual inspection system within a production line such that inspection and/or fault detection can be performed in an inline manner. In certain embodiments, the visual inspection system may include one or more components that prevent the object from damaging the visual inspection devices. For example, a quartz tube or other suitable transparent sleeve may be positioned within the channel to prevent the object from contacting the visual inspection devices. In certain embodiments, the system may also include one or more suitable air ducts or ventilation components that facilitate the removal of unwanted debris within the system and/or the cooling of internal components.

Other embodiments of the disclosure are directed to methods for inline contactless visual inspection of objects, such as magnet wire, cable, conduit, tubing, etc. A channel that extends along a longitudinal direction and includes an inner surface having a diameter that narrows along the longitudinal direction between a first point and an examination area may be provided. In certain embodiments, the inner surface of the channel may be diffuse surface. Light may be emitted into the channel from a light source positioned on an opposite side of the first point from the examination area along the longitudinal direction. An object to be examined may be traversed through the examination area, and the object may be examined by at least one visual inspection device positioned around an outer circumference of the examination area. A determination may then be made as to whether one or more defects are present on the object based upon the examination by the at least one visual inspection device.

Light may be emitted into the channel utilizing a wide variety of suitable light sources as desired in various embodiments. For example, light may be emitted by one or more ring lights, LED ring lights, or other suitable light sources. In certain embodiments, a single light source (e.g., a ring light, a plurality of lights proximate to one another, etc.) may be utilized to emit light into the channel from a single longitudinal end of the channel. In other embodiments, respective light sources (e.g., two respective ring lights, two groups of lights, etc.) may be utilized. For example, light may be emitted into the channel towards the examination area from opposite longitudinal ends of the channel. When two light sources are utilizes, the inner surface of the channel may have a diameter that narrows along the longitudinal direction in both longitudinal directions towards the examination area. For example, a first light source may be positioned on an opposite side of the first point from the examination area. The diameter of the inner surface may then further narrow between a second point and the examination area, and the second light source may be positioned on an opposite side of the second point from the examination area. In this regard, the respective light emitted by each light source may be focused and/or reflected onto the object with the examination area. Further, the diameter of the channel may narrow at a wide variety of suitable rates as desired in various embodiments. In certain embodiments, the diameter may narrow at an angle (or a combination of angles) along the longitudinal direction between approximately five degrees (5°) and approximately sixty-five degrees (65°).

The object may also be examined via a wide variety of suitable visual inspection devices. For example, one or more suitable cameras may be utilized as visual inspection devices. In certain embodiments, a plurality of cameras may be positioned at spaced locations along an outer circumference or outer periphery of the examination area. Each visual inspection device may be configured to examine or visually inspect an object as it passes through the examination area in order to detect or facilitate detection (e.g., through a software analysis of captured images or data) of faults or defects on the object.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
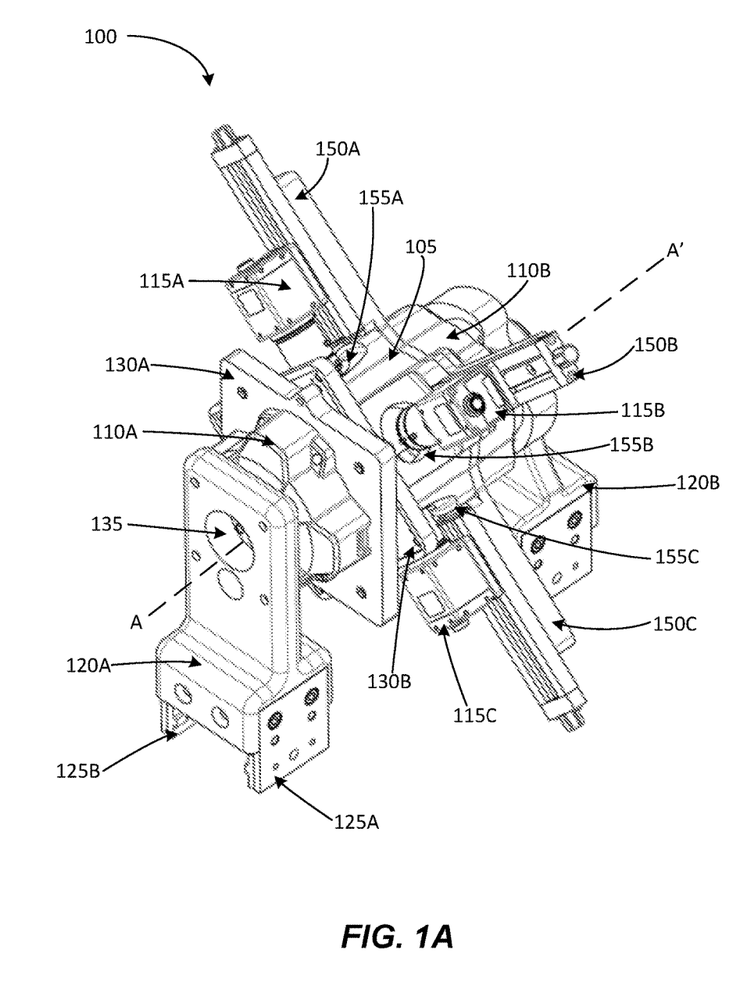
FIG. 1A illustrates a perspective view of an example visual inspection system, according to an illustrative embodiment of the disclosure.
Figure 1B:
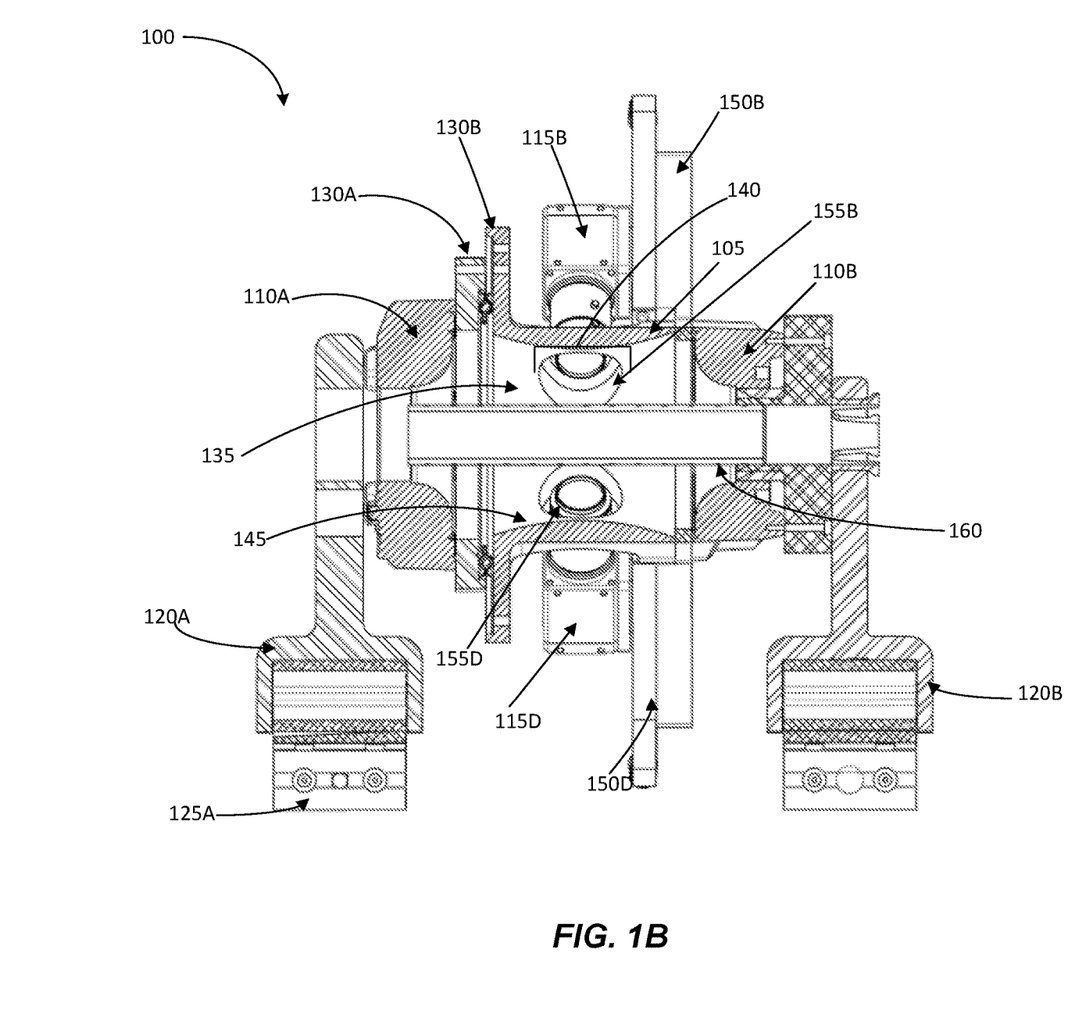
FIG. 1B illustrates a cross-sectional view of the example visual inspection system of FIG. 1A.
Figure 2A:
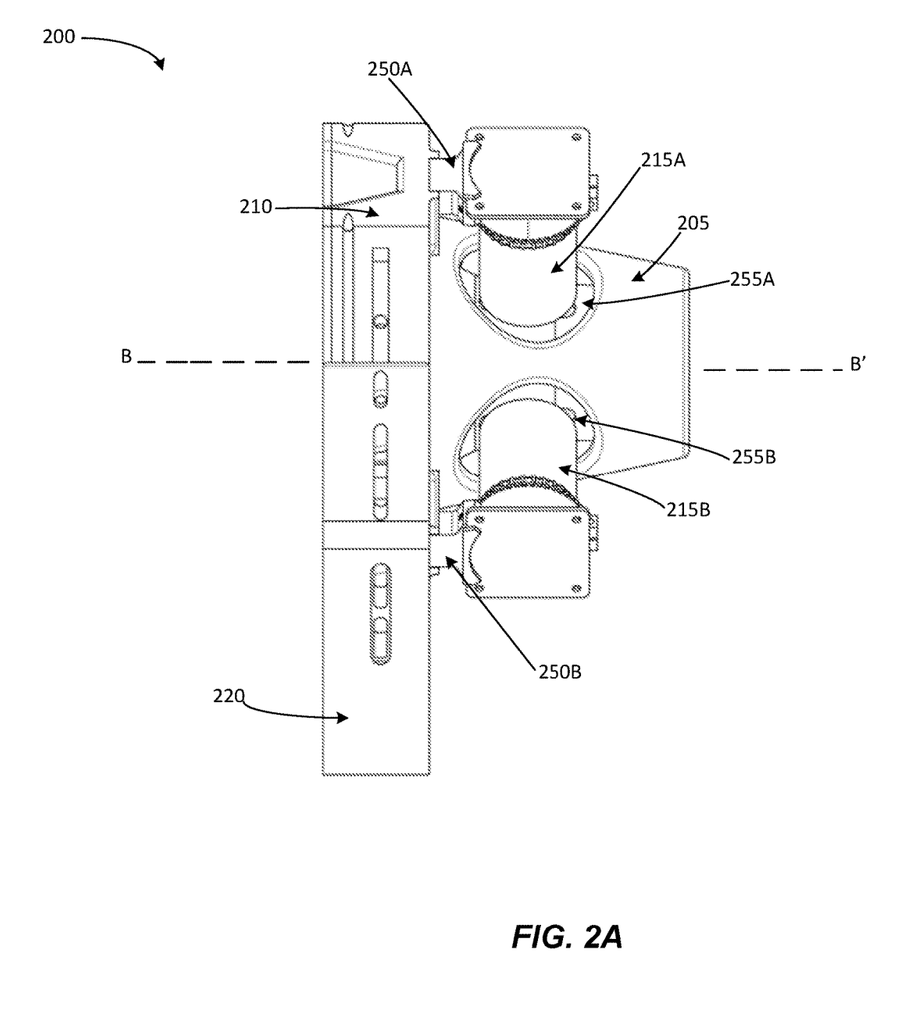
FIG. 2A illustrates a side view of another example visual inspection system, according to an illustrative embodiment of the disclosure.
Figure 2B:
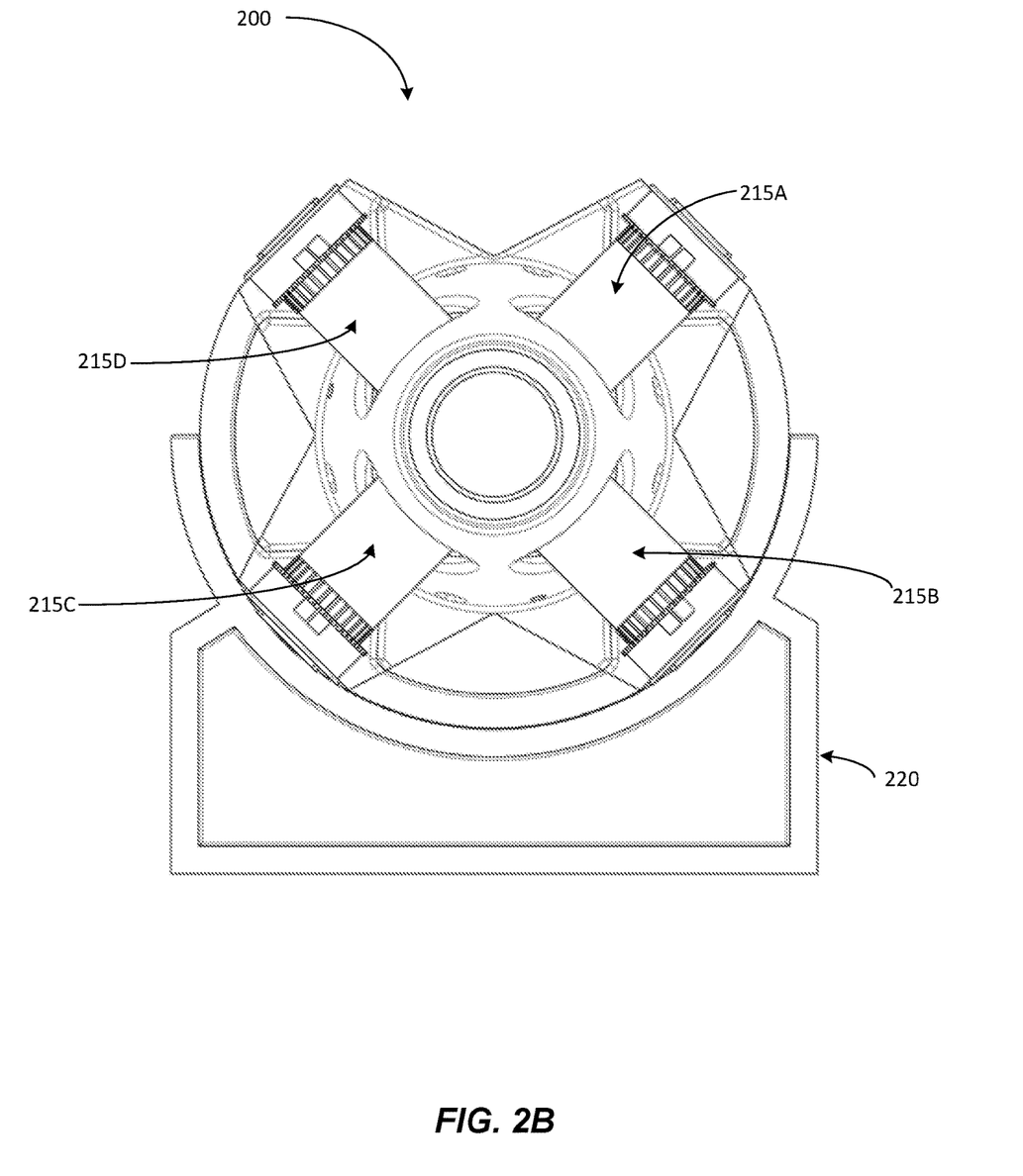
FIG. 2B illustrates an end view of the example system of FIG. 2A.
Figure 2C:
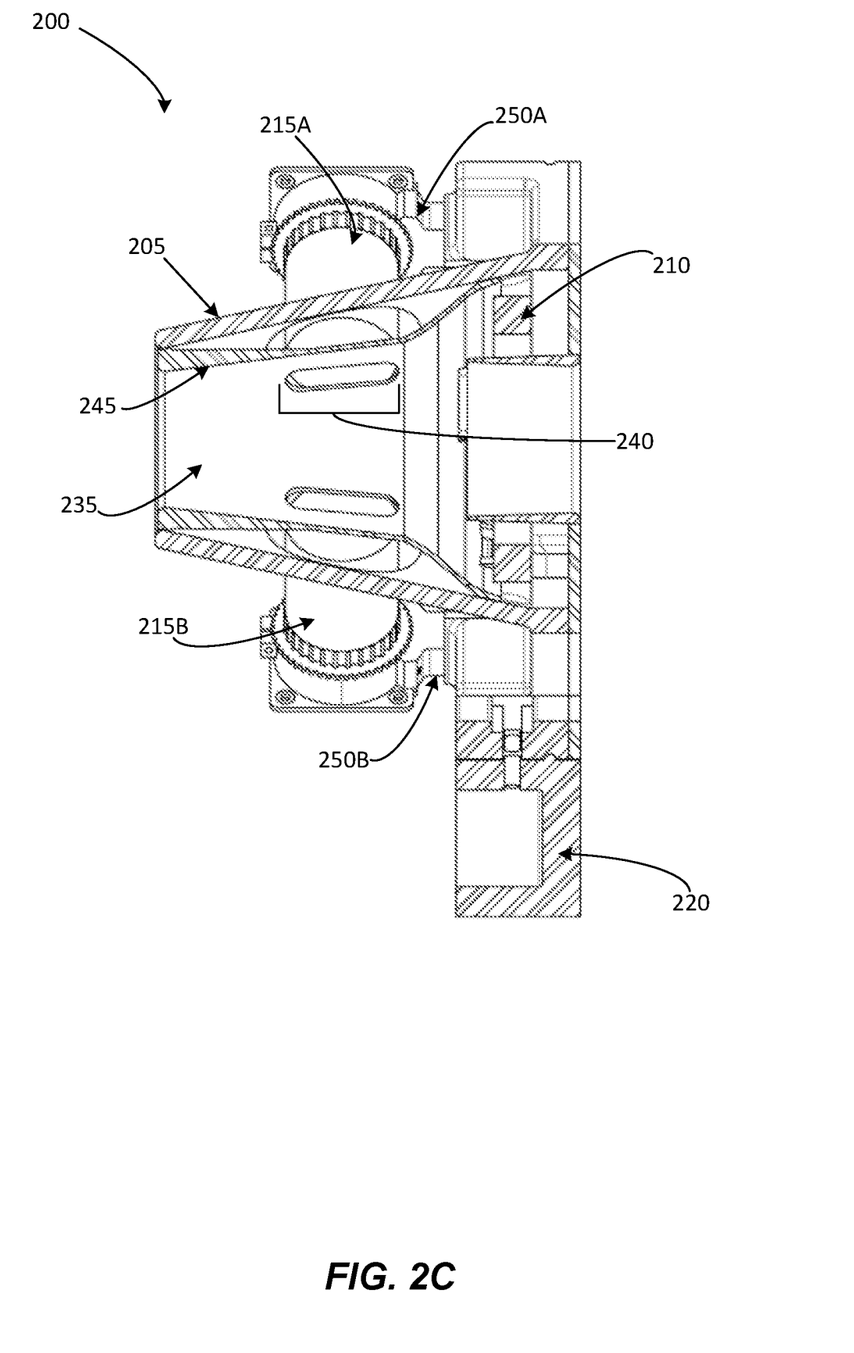
FIG. 2C illustrates a cross-sectional view of the example system of FIG. 2A.

FIGS. 1A-1B depict different views of an example visual inspection system 100 that may be utilized to examine and detect faults in an object in an inline and contactless manner. In particular, FIG. 1A illustrates a perspective view of the system 100, and FIG. 1B illustrates a cross-sectional view of the system 100 taken along the longitudinal direction A-A'. The system 100 includes respective light sources positioned on opposite sides of an examination area along the longitudinal direction. The example system 100 is described in greater detail below with reference to FIGS. 1A-1B. FIGS. 2A-2C depict different views of another example visual inspection system 200 that may be utilized to examine and detect faults in an object in an inline and contactless manner. In particular, FIG. 2A illustrates a side view of the example system 200; FIG. 2B illustrates an end view of the system 200; and FIG. 2C illustrates a cross-sectional view of the system 200 taken along the longitudinal direction B-B'. The system 200 includes a single light source positioned on one side of an examination area along the longitudinal direction. The example system 200 is described in greater detail below with reference to FIGS. 2A-2C.

Visual inspection systems in accordance with embodiments of the disclosure, such as the example systems 100, 200 illustrated in FIGS. 1A-2C, may be utilized to examine and/or inspect a wide variety of suitable types of objects. These objects may include any suitable elongated objects that are fed through a visual inspection system, illuminated, and examined for defects utilizing suitable visual inspection devices. Examples of suitable objects that may be examined include, but are not limited to, magnet wire, wire, cable, conduit, pipe, tubing, etc. In certain embodiments, a visual inspection system may be utilized to examine and evaluate magnet wire. Additionally, the magnet wire may include a wide variety of suitable cross-sectional shapes, such as a circular or rectangular cross-sectional shape.

Turning now to the example system 100 of FIGS. 1A-1B, the system 100 may include a housing 105, one or more light sources 110A, 110B, and one or more visual inspection devices 115A-D. The housing 105 may provide a wide variety of benefits including, but not limited to, protecting one or more internal components of the system 100 from physical damage, preventing or limiting dust or debris from damaging one or more internal components, and/or limiting dust or debris from negatively impacting visual inspection of an object as it traverses through the housing 105. In certain embodiments, the housing 105 may be formed from a single or unitary component. As desired, the housing 105 may include one or more access panels or other features that allow internal components of the system 100 to be accessed. In other embodiments, the housing 105 may include a plurality of components that may be selectively attached or connected to one another. As desired, the housing 105 may include any suitable number of components that are connected together via any suitable attachment means, such as bolts, clips, etc.

The housing 105 may be formed from a wide variety of suitable materials and/or combinations of material. For example, the housing 105 may be formed from metallic materials (e.g., steel, etc.), metallic alloys, plastics (e.g., ABS plastic, polycarbonate, etc.), etc. As desired, if the housing includes multiple components, the components may all be formed from the same material(s) or, alternatively, at least two components may be formed from different materials. The housing 105 may also be formed via a wide variety of suitable techniques, such as additive manufacture, casting, molding, etc. In certain embodiments, the housing 105 may be formed via 3D printing or additive manufacturing.

The housing 105 may also be formed with a wide variety of suitable dimensions (e.g., length, width, height, cross-sectional area, etc.). In certain embodiments, the dimensions of the housing 105 may be based at least in part on the size(s) of objected intended to be evaluated by the system 100. Utilizing magnet wire as an example object, the system 100 may be designed with relatively small dimensions, thereby permitting the system 100 to be easily installed in relatively small spaces within a magnet wire production line. For example, the system 100 may occupy a volume of approximately 3.50 cubic feet or less. Accordingly, the housing 105 may be appropriately sized to fit within the small footprint of the overall system 100. In one example embodiment, the overall system 100 may have a width of approximately 20.2 inches (513 mm), a longitudinal length of approximately 14.3 inches (363 mm), and a height of approximately 20.2 inches (513 mm). With certain system designs, the visual inspection devices 115A-D and their corresponding mounting rails 150A-D may extend outwardly and define the width and height dimensions of the system 100. In other embodiments, different dimensions may be utilized to accommodate other wire sizes or other objects to be examined.

In certain embodiments, one or more suitable components may be utilized to mount or otherwise position the system 100 within a manufacturing or production environment, thereby facilitating inline examination of objects. As shown in FIGS. 1A and 1B, suitable mounting brackets 120A, 120B may be utilized to position the system 100 within a manufacturing line or other suitable environment. Any number of suitable mounting brackets 120A, 120B may be utilized as desired. In the illustrated embodiment, two mounting brackets 120A, 120B may be utilized, and other components of the system 100 may be attached to the mounting brackets 120A, 120B. For example, the housing 105 and light sources 110A, 110B may be attached between and to the mounting brackets 120A, 120B. The mounting brackets 120A, 120B may then be used to secure the system 100 at a suitable location or position in a manufacturing environment. For example, each mounting bracket (generally referred to as mounting bracket 120) may include one or more suitable plates 125A, 125B that are utilized to affix the system 100 to a rail or other component within a wire line or other manufacturing environment. The system 100 may be oriented in any suitable direction within a wire line (or other environment), such as a horizontal or a vertical orientation. Any suitable attachment components (e.g., bolts, pins, clips, etc.) may be utilized to secure the plates 125A, 125B to the mounting brackets 120A, 120B and/or to secure the plates 125A, 125B and mounting brackets 120A, 120B to a manufacturing line. Additionally, the mounting brackets 120A, 120B and/or the plates 125A, 125B may be formed from a wide variety of suitable materials and/or combinations of materials. For example, the mounting brackets 120A, 120B and/or plates 125A, 125B may be formed from metallic materials (e.g., steel, etc.), metallic alloys, plastics (e.g., ABS plastic, polycarbonate, etc.), etc. Additionally, the mounting brackets 120A, 120B and plates 125A, 125B may be formed with a wide variety of suitable dimensions (e.g., length, width, height, cross-sectional area, etc.). Although mounting brackets 120A, 120B are described herein, a wide variety of other suitable components (e.g., mounting plates affixed to the housing, etc.) may be utilized in other embodiments to secure the system 100 within a manufacturing environment, such as mounting rails and/or other attachment mechanisms. The mounting brackets 120A, 120B are provided by way of illustrative example only.

With continued reference to FIGS. 1A and 1B, a wide variety of suitable components may be utilized to attach the housing 105, light sources 110A, 110B, and/or other components of the system 100 to the mounting brackets 120A, 120B. In certain embodiments, one or more light sources 110A, 110B may be affixed directly to respective mounting brackets 120A, 120B and the housing 105 may be affixed to the light source(s) 110A, 110B. In other embodiments, the housing 105 may be affixed to the mounting brackets 120A, 120B and the light source(s) may be positioned within the housing 105. In yet other embodiments, a combination of affixing the housing 105 and one or more light sources 110A, 110B to the mounting brackets 120A, 120B may be utilized. Additionally, any suitable number of mounting plates, such as mounting plates 130A, 130B, may be utilized to affix light sources 110A, 110B, the housing, 105, and or mounting brackets 120A, 120B to one another.

As shown in FIGS. 1A and 1B, one or more mounting plates 130A, 130B may be utilized to affix a first light source 110A to the housing 105. In other words, the first light source 110A may be affixed directly to a mounting bracket 120A on one longitudinal side and then affixed to the housing 105 on an opposite longitudinal side via mounting plates 130A, 130B. In this regard, the light source 110A may remain stationary while the housing 105 can be rotated around a suitable axis, such as a longitudinal axis defined by line A-A'. A first mounting plate 130A may be affixed to the light source 110A, a second mounting plate 130B may be affixed to the housing 105. Alternatively, the housing 105 may include a suitable mounting portion or component. In other words, the second mounting plate 130B may be integrated into the housing. The two mounting plates 130A, 130B may also be rotatably attached together via any suitable components, such as a turntable component, rotating bearing, rotating swivel, etc. The second light source 110B may be affixed directly to an opposite side of the housing 105 and rotatably affixed to the second mounting bracket 120B via any suitable components (e.g., a rotating bearing, rotating swivel, turntable, etc.). In this regard, the second light source 110B may be rotated along the longitudinal axis. In other embodiments, both light sources 110A, 120A could be rotatably affixed within the system or fixed such that they remain stationary. Additionally, the housing 105 may be configured to remain stationary or to rotate along the longitudinal axis. The ability to rotate the housing 105 may facilitate examination of an object from any direction or combination of directions.

In the event that one or more mounting plates 130A, 130B are utilized, each mounting plate (generally referred to as mounting plate 130) may be formed from any suitable material or combination of materials, such as metallic materials (e.g., steel, etc.), metallic alloys, plastics (e.g., ABS plastic, polycarbonate, etc.), etc. Additionally, each mounting plate 130 may be formed with a wide variety of suitable dimensions (e.g., length, width, height, cross-sectional area, etc.). Additionally, a wide variety of other suitable attachment mechanisms may be utilized as desired in other embodiments to affix the mounting brackets 120A, 120B, light sources 110A, 110B, and the housing 105 together.

With continued reference to FIGS. 1A and 1B, a channel 135 may longitudinally extend through the housing 105. An object to be examined by the system 100 may be traversed through the channel 135. For example, the object may enter the housing 105 via the channel at a first longitudinal end, traverse through the channel 135, and exit the housing via an opposite longitudinal end. The channel 135 may be formed with a wide variety of suitable dimensions as desired in various embodiments. In certain embodiments, the dimensions of the channel 135 may be based at least in part upon the dimensions of an object to be examined by the system 100. As desired, corresponding openings aligned with the channel 135 may be formed through other components of the system 100, such as the mounting brackets 120A, 120B. Similarly, the light sources 110A, 110B may be arranged such that the object may traverse through the channel without contacting the light sources 110A, 110B. In certain embodiments, the light sources 110A, 110B may be ring lights, and the object may pass through an opening in the middle of the ring lights.

Additionally, the channel 135 may include an examination area 140 at which the object is evaluated by the one or more visual inspection devices 115A-D. In other words, the visual inspection devices 115A-D may be positioned around an outer periphery or circumference of an examination area 140 within the channel 135. As an object is traversed through the channel 135, it may be examined and evaluated by the inspection devices 115A-D as the object passes through the examination area 140. The examination area 140 may be positioned at any suitable point along a longitudinal length of the channel 135. Additionally, the examination area 140 may have a wide variety of suitable dimensions, such as any suitable longitudinal length, diameter, and/or cross-sectional area. In certain embodiments, the dimensions of the examination area 140 may be based at least in part upon the dimensions of an object to be inspected and/or the dimensions of the visual inspection devices 115A-D.

The system 100 may optionally include any suitable number of guides that facilitate maintaining an object at a desired position within the housing 105 and/or examination area 140 for suitable evaluation by the inspection devices 115A-D. For an example system 100 configured to examine wire (e.g., rectangular magnet wire, etc.), the system 100 may include a plurality of wire guide rollers (not shown), such as horizontal guide rollers respectively positioned on opposite ends of the housing 105 and vertical guide rollers respectively positioned on opposite ends of the housing 105. In one example embodiment, a first horizontal roller may assist in maintaining a horizontal position of a wire and a first vertical roller may assist in maintaining a vertical position of the wire as the wire enters the housing 105. Similarly, a second horizontal roller may assist in maintaining a horizontal position of the wire and a second vertical roller may assist in maintaining a vertical position of the wire as the wire exits the housing 105. As a result, the wire may be passed through the examination area 140 within a desired or optimal distance (or range of distances) from the inspection devices 115A-D. Any suitable types of guide rollers may be utilized as desired, such as rollers that include a fixed first roller component and a spring mounted second roller component. Such a roller may be utilized to accommodate different wire sizes. Other suitable types of wire guides (e.g., dies, funnels, etc.) may be utilized in other embodiments and will appreciated by those skilled in the art. Additionally, other suitable types of guides may be utilized for other types of objects to be examined.

According to an aspect of the disclosure, the channel 135 may include an inner surface 145 that functions to focus or reflect the light emitted from the light sources 110A, 110B onto the object within the examination area 140. More specifically, the channel 135 may include a diameter (or other suitable cross-sectional area) that narrows along a longitudinal direction of the channel 135 between a respective light source and the examination area 140. For the example system 100 of FIGS. 1A-1B, the channel 135 may narrow along the longitudinal direction between a first point and the examination area 140 with the first light source 110A positioned on an opposite side of the first point from the examination area along the longitudinal direction. Additionally, the channel 135 may narrow along the longitudinal direction between a second point and the examination area 140 with the second light source 110B positioned on an opposite side of the second point from the examination area along the longitudinal direction. With a visual inspection system that includes a single light source, such as the example system 200 of FIGS. 2A-2C described in greater detail below, the channel may simply narrow between a first point and the examination area with the light source positioned on an opposite side of the first point.

In certain embodiments, the inner surface 145 of the channel 135 may narrow in a manner that facilitates focusing and/or reflecting light emitted form the light sources 110A, 110B onto the objects within the examination area 140. In certain embodiments, light may also reflect off of the object and towards the visual inspection devices 115A-D. The focusing and reflection of light provided by the inner surface 145 may provide much less glare than conventional inspection systems that utilize mirrors to focus light. As desired, the rate of narrowing may be based at least in part on a wide variety of suitable factors, such as the dimensions of the light sources 110A, 110B (e.g., the diameters of ring lights, etc.), a maximum diameter size of the channel 135 (e.g., a maximum diameter corresponding to the dimensions of the light sources 110A, 110B, etc.), a desired diameter or range of diameters of the channel within the examination area 140, and/or a minimum diameter size required to facilitate traversing of an object through the channel 135. The inner surface 145 may have a diameter (or cross-sectional area) that narrows (i.e., narrows along a longitudinal direction in an area between a light source and the examination area 140) at a wide variety of suitable rates. In certain embodiments, the diameter may narrow at an angle (or a combination of angles) along the longitudinal direction between approximately five degrees (5°) and approximately sixty-five degrees (65°). In various embodiments, the diameter may narrow at an angle of approximately 5, 10, 15, 20, 25, 30, 35, 40, 45, 50, 55, 60, or 65 degrees, or at an angle included in a range between any two of the above values. Additionally, it will be appreciated that the angle of narrowing may change or vary over the longitudinal length of the channel 135. For example, the angle of narrowing may change in a parabolic manner for sections of the channel having a convex shape.

Additionally, in certain embodiments, the diameter of the inner surface 145 may narrow in accordance with a wide variety of suitable geometric shapes. For example, in certain embodiments, the diameter of the inner surface 145 may narrow in a convex manner between a light source 110 and the examination area 140. In other words, the inner surface 145 may have a convex shape. An inner surface 145 having a convex shape was found to optimally focus light into the examination area 140. In other embodiments, the diameter of the inner surface 145 may narrow in a parabolic manner. In yet other embodiments, the diameter of the inner surface 145 may narrow with a linear slope. Other suitable shapes or rates of narrowing may be utilized as desired in other embodiments provided that emitted light is adequately focused onto an object within the examination area 140.

In certain embodiments, the inner surface 145 of the channel 130 may continue to narrow within the examination area 140 or within desired portions of the examination area 140. For example, if a single light source is used, the inner surface 145 may narrow either through an entire longitudinal length of the examination area 140 or through a desired longitudinally extending portion of the examination area 140. As another example, if two light sources 110A, 110B are used, the inner surface 145 may narrow along a longitudinal length of the channel 135 from a first point (i.e., a first point positioned between a first light source 110A and the examination area 140) up to the examination area 140 and, in some embodiments, through a desired portion of the examination area 140. Similarly, the inner surface 145 may narrow along a longitudinal length of the channel 135 from a second point (i.e., a second point positioned between a second light source 110B and the examination area 140) up to the examination area 140 and, in some embodiments, through a desired portion of the examination area 140. In other words, along a longitudinal direction, the inner surface 145 may have a diameter that narrows between the first light source 110A and the examination area 140 and then begins to expand or broaden towards the second light source 110B. In certain embodiments, approximately the entire longitudinal length of the inner surface 145 through the examination area 140 may include some rate of diameter narrowing or broadening (e.g., inner surface 145 is convex through the examination area 140). In other embodiments, at least a portion of the examination area 140 along its longitudinal length may include a relatively constant diameter (or cross-sectional area).

As desired, the inner surface 145 (or a desired portion of the inner surface 145) may incorporate a diffuse surface or diffuse materials that further facilitate the diffusion, diffuse reflection, or spreading of light within the channel 135. The diffusion of light emitted towards the examination area 140 has been found to improve the ability of visual inspection devices to evaluate an object. A wide variety of suitable diffuse materials may be utilized as desired such that the inner surface 145 functions as a diffuse surface. For example, the inner surface 145 may be coated with a diffuse material, such as white paint, other diffuse paint, chalk, clay, etc. Additionally, in certain embodiments, the inner surface 145 may be formed as a rough surface or include a rough finish to facilitate diffusion.

With continued reference to FIGS. 1A and 1B, one or more light sources 110A, 110B may be incorporated into the system 100. Any suitable number of light sources may be utilized. Additionally, a wide variety of suitable types of light sources may be utilized. As shown, a respective ring light 110A, 110B may be positioned on opposite longitudinal side of the housing 105 such that each ring light 110A, 110B is configured to emit light into the channel 135 towards the examination area 140. Advantageously, a ring light permit an object to pass through a central opening and through the channel 135. A wide variety of suitable ring lights may be used as desired in various embodiments. In certain embodiments, LED ring lights may be utilized. Each ring light may have an inner diameter that is selected to function with the size of an object to be inspected and an outer diameter that is selected to facilitate the emission of a desired amount of light. In certain embodiments, CA-DRM5X ring lights marketed and sold by Keyence Corporation may be utilized. Other suitable ring lights may be utilized in other embodiments. In yet other embodiments, a plurality of LED lights may be positioned at desired locations (e.g., spaced locations along an outer circumference or periphery, etc.) such that the plurality of lights emit a desired amount of light into the channel 135. A wide variety of other suitable lighting configurations can be utilized in other embodiments.

As shown in FIGS. 1A and 1B, two respective light sources may be utilized in certain embodiments. As described in greater detail below with reference to FIGS. 2A-2C, in other embodiments, a single light source may be utilized. Certain conventional visual inspection devices position ring lights around each visual inspection device. For example, a ring light may be positioned around each camera lens used in a conventional device. With a system that incorporates four cameras, four ring lights or other light sources would be utilized. Embodiments of the present disclosure may therefore utilized fewer light sources than certain conventional devices while incorporating the same number or a similar number of cameras or other visual inspection devices. Thus, the inventive systems may operate in a more efficient manner.

As desired, each light source (generally referred to as light source 110) may be stationary or permitted to rotate, spin, or otherwise move. As shown in FIGS. 1A and 1B, a first light source 110A may be stationary while a second light source 110B may rotate with the housing 105. Other configurations of light sources that are stationary and/or that rotate may be utilized in other embodiments.

With continued reference to FIGS. 1A and 1B, the system 100 may include one or more visual inspection devices 115A-D. Each visual inspection device (generally referred to as visual inspection device 115) may evaluate an object that is passed through the examination area 140 in a contactless and inline manner and detect or identify defects or faults on the surface of the object. For example, a visual inspection device may be configured to examine or visually inspect an object and evaluate captured images or data utilizing one or more suitable algorithms or software (e.g., software executed by the visual inspection device, software executed by one or more computing devices in communication with the visual inspection device, etc.) to identify faults or defects on the object. For example, as a magnet wire is manufactured and insulation is formed on the magnet wire, one or more visual inspection devices 115A-D may examine the surface of the wire insulation and a suitable algorithm may be utilized to determine whether defects, beads, or other faults are present. The proper focusing and/or diffusion of light within the examination area 140 may facilitate improved or enhanced detection by the visual inspection devices 115A-D relative to conventional devices.

Any number of suitable visual inspection devices may be incorporated into the system 100 as desired. As shown, four visual inspection devices 115A-D may be utilized. The illustrated system 100 is intended for use in inspecting objects having a rectangular cross-sectional shape (e.g., rectangular magnet wire, etc.). Accordingly, the use of four visual inspection devices 115A-D permits each side of the object to be examined. Other suitable numbers of visual inspection devices 115A-D may be utilized in conjunction with objects having other suitable cross-sectional shapes (e.g., circular, elliptical, hexagonal, etc.). In other words, a number of visual inspection devices may be based at least in part upon the dimensions of an object to be examined. In various embodiments, the system 100 may include one, two, three, four, five, six, eight, ten, or any other desired number of visual inspection devices. Additionally, in certain embodiments, the housing 105 may rotate in order to rotate or adjust the positions of the visual inspection devices 115A-D and/or the angles at which objects are examined.

A wide variety of suitable types of visual inspection devices 115A-D may be utilized as desired in various embodiments. For example, one or more suitable cameras may be utilized as visual inspection devices 115A-D. Other suitable visual inspection devices may include any suitable devices configured to capture an image of an object for evaluation. In certain embodiments, as shown, a plurality of visual inspection devices 115A-D may be positioned at spaced locations along an outer circumference or outer periphery of the examination area 140. Any suitable spacing may be utilized between adjacent inspection devices 115A-D. For example, four visual inspection devices 115A-D may be spaced approximately 90 degrees apart from one another.

Each visual inspection device 115 may be attached to other components of the system 100 utilizing a wide variety of suitable attachment mechanisms and/or techniques. As shown, a plurality of mounting rails 150A-D may extend from the housing 105, and each visual inspection device 115A-D may be affixed to a corresponding mounting rail 150A-D. The use of mounting rails 150A-D may permit the positions of the visual inspection devices 115A-D to be adjusted (e.g., adjusted along a length the rail), the use of various sizes of visual inspection devices, and/or easy removal, maintenance, and/or replacement of visual inspection devices 115A-D. In other embodiments, visual inspection devices 115A-D may be directly affixed to an outer surface of the housing 105 (e.g., attached via bolts, pins, etc.), attached to the housing 105 utilizing other suitable components, or attached to components of the system 100 other than the housing 105. Additionally, the mounting rails 150A-D may be formed with a wide variety of suitable dimensions and/or from a wide variety of suitable materials or combinations of materials, such as metallic materials (e.g., steel, etc.), metallic alloys, plastics (e.g., ABS plastic, polycarbonate, etc.), etc.

Openings or slots 155A-D may be formed through the housing 105 to permit the visual inspection devices 115A-D to evaluate an object. For example, a respective opening 155A-D may be formed through the housing 105 for each of the visual inspection devices 115A-D. As desired, a respective cap may be positioned over a lens of each visual inspection device 115A-D, and a cap may include a slot or opening that operates to focus or narrow an area of an object that is examined. As desired, filters may additionally or alternatively be utilized. In operation, each visual inspection device 115 may capture an image or other data from an object through a corresponding opening or slot (as well as through a slot in a cap or through a filter), and the captured images/data may be evaluated.

In certain embodiments, the system 100 may additionally include one or more components that protect the visual inspection devices 115A-D and/or other sensitive components of the system 100 from damage caused by an object traversed through the system 100 and/or caused by initially feeding an object into the system 100. A wide variety of suitable protection components may be utilized as desired. For example, in certain embodiments, a transparent protective sleeve 160 may be positioned within the channel 135 between the object and the visual inspection devices 115A-D and/or the inner surface 145. A transparent sleeve 160 may be formed from a wide variety of suitable materials. For example, in certain embodiments, a quartz tube may be utilized as a protective sleeve 160. Additionally, a transparent sleeve may be formed with a wide variety of suitable dimension, such as any suitable thickness. In other embodiments, a removable sleeve may be positioned within the channel 135 to facilitate initial feeding an object into the system 100. The sleeve may then be removed prior to the object being traversed through the system 100 and examined. Suitable guides (e.g., wire rollers, etc.) may maintain the position of the object within the channel 135 during operation. In yet other embodiments, removable caps or caps that may be selectively opened and closed may be utilized to protect the visual inspection devices 115A-D during initial feeding of an object into the system 100. In yet other embodiments, transparent protective covers or caps may be positioned over the lenses of the visual inspection devices 115A-D. A wide variety of other suitable protective components may be utilized as desired in other embodiments.

In certain embodiments, the system 100 may optionally include one or more air ducts that facilitate the supply or input of pressurized air into the housing 105 via a suitable ventilation system or air supply (not shown). The pressurized air may assist in removing and/or keeping debris out of the housing 105. As a result, internal components of the system 100 (e.g., the visual inspect devices 115A-D) may be maintained in better working order and kept clean. Additionally, the pressurized air may assist in cooling one or more internal components of the system 100, such as any internal computing devices (e.g., circuit boards, electronic boards, microcontrollers, etc.).

The system 100 may include any suitable number of computing devices that control the operations of the system 100. A wide variety of suitable computing devices may be utilized as desired, such as circuit boards, programmable logic arrays, microcontrollers, minicomputers, etc. Alternatively, the system 100 may be controlled via one or more external computing devices in communication with various components of the system 100. The computing device(s) may perform a wide variety of suitable operations as desired including, but not limited to, providing control signals to the visual inspection devices 115A-D, processing and evaluating images and/or data received from the visual inspection devices 115A-D, identifying or determining whether any defects are present on an examined object, counting defects, calculating the size of defects, generating suitable alerts or output signals, and/or communicating with any suitable number of external devices or systems. In one example embodiments, the computing device(s) may be configured to receive a wide variety of signals or data, such as line speed inputs, one or more threshold or baseline values (e.g., a defect amplitude thresholds, defect count thresholds, etc.), one or more resets signals, etc. Based upon its calculations and processing, the computing device(s) may be configured to output any number of suitable signals, such as one or more identified defect counts (e.g., counts for different defect sizes), defect amplitudes, defect longitudinal lengths, identification information for visual inspection devices 115A-D that identified defects, handshake signals. The computing system(s) may also be configured to store a wide variety of suitable data, such as count data for defects, etc.

The system 100 may provide a wide variety of benefits or advantages over prior visual inspection systems or devices. First, the focusing, reflection, and/or diffusion of light onto an object within an examination area may result in more accurate detection of defects via visual inspection. Many conventional systems incorporate mirrors to focus or reflect light, and these mirrors may cause glare that degrades the performance of the visual inspection devices. Additionally, the system may utilize fewer lights than certain conventional systems having a similar number of visual inspection devices, thereby resulting in greater efficiency, a lower cost, and smaller overall dimensions.

In operation, the system 100 may be capable of evaluating or examining an object in a non-contact and non-destructive manner. The system 100 may also operate in an in-line manner, for example, while an object is being produced or manufactured. Further, the system 100 may be capable of providing real-time feedback as faults or defects are identified.

The system 100 may include a wide variety of other components as desired in other embodiments. For example, the system 100 may include any suitable object guides (e.g., wire guides, etc.), mounting components, and/or computing devices (or controllers). As another example, the system 100 may be capable of wired and/or wireless communication with external systems or devices. It will be appreciated that various embodiments of the disclosure may include more or less components than those set forth and described above with reference to FIGS. 1A-1B. Indeed, the illustrated system 100 is provided by way of non-limiting example only.

Turning to FIGS. 2A-2C, another example system 200 that facilitates visual inspection of an object is depicted. In particular, FIG. 2A illustrates a side view of the example system 200; FIG. 2B illustrates an end view of the system 200; and FIG. 2C illustrates a cross-sectional view of the system 200 taken along the longitudinal direction B-B'. The system 200 may include components similar to those of the system 100 of FIGS. 1A-1B. For example, the system 200 may include a housing 205, a light source 210, and one or more visual inspection devices 215A-D. However, in contrast to the system 100 of FIGS. 1A-1B, the system 200 may include a single light source 210 rather than two light sources.

The housing 205 may be formed from similar materials as those set forth above with reference to FIGS. 1A-1B. Additionally, the housing 205 may be formed with a wide variety of suitable dimensions. In certain embodiments, the housing 205 may be formed with smaller dimensions that the housing 105 of FIGS. 1A-1B (assuming the light sources are similarly sized) given that only a single light source 210 is used. As shown, the housing 205 and the light source 210 may optionally rest or be positioned within a suitable cradle 220 or stand structure. The cradle 220 permits the housing 205 to be rotated within the cradle 220. As desired, any suitable attachment components (e.g., bolts, pins, etc.) may be utilized to secure the housing 205 at a desired position during operation of the system 200. The cradle 220 may include any suitable number of legs or rails that may be mounted within a production line or production environment, and the cradle 220 may include extensions or arms that allow the housing 205 to be secured in place. As an alternative to utilizing the illustrated cradle 220, any suitable number of mounting brackets or other components may be utilized to secure the housing 205 and/or the overall system 200 within a production environment.

Additionally, the system 200 may include a channel 235 that longitudinally extends through the housing 205. Much like the system 100 of FIGS. 1A-1B, an object to be inspected may be traversed through the channel 235 and examined by the visual inspection devices 215A-D within a suitable examination area 240. Additionally, the channel 235 may have an inner surface 245 with diameter that narrows in a longitudinal direction between the light source 210 and the examination area 240 (or between a longitudinal point positioned between the light source 210 and the examination area 240). The narrowing of the channel 235 may focus and/or reflect the light emitted by the light source 210 on the object within the examination area 240, thereby permitting desired visual inspection by the inspection devices 215A-D.

Much like the inner surface 145 of FIGS. 1A-1B, the inner surface 245 may have a diameter (or cross-sectional area) that narrows at any suitable rate and/or with any suitable geometric shape. For example, in certain embodiments, the diameter of the inner surface 245 may narrow in a convex manner between a light source 210 and the examination area 240. In other words, the inner surface 245 may have a convex shape. In other embodiments, the diameter of the inner surface 245 may narrow in a parabolic manner. In yet other embodiments, the diameter of the inner surface 245 may narrow with a linear slope or at a constant rate. Other suitable shapes or rates of narrowing may be utilized as desired in other embodiments provided that emitted light is adequately focused onto an object within the examination area 240.

Additionally, an inner surface (for either system 100 of FIGS. 1A-1B or system 200 of FIGS. 2A-2C) may include any suitable combination of narrowing shapes. For example, a first longitudinally extending portion may have a diameter that narrows in a convex manner while a second longitudinally extending portion has a diameter that narrows with a linear slope. FIG. 2C illustrates an example inner surface 245 including a first portion (e.g., a portion between the light source 210 and the beginning of the examination area 240) that narrows in a convex manner and a second portion (e.g., a portion extended through and passed the examination area 240) that narrows in a linear manner. Additionally, in certain embodiments, the inner surface 245 of the system may continue to narrow through and on an opposite side of the examination area 240 from the light source 210. With only a single light source 210, it is not necessary for the inner surface 245 to broaden towards a second light source. Further, the continued narrowing may help to reflect light emitted passed the examination area 240 back into the examination area 240, thereby mitigating the absence of light from a second light source. Additionally, in certain embodiments, the inner surface 245 may include or be formed from diffuse materials in a similar manner as that described above for the system 100 of FIGS. 1A-1B.

With continued reference to FIGS. 2A-2C, the light source 210 and the visual inspection devices 215A-D may be similar to those described above with reference to the system of FIGS. 1A-1D. Any suitable number of visual inspection devices 215A-D may be utilized as desired. Further, a wide variety of suitable types of visual inspection devices 215A-D may be utilized, such as suitable cameras. As shown in FIGS. 2A-2C, the visually inspection devices 215A-D may be secured to the cradle 220 via any suitable number of mounting brackets 250A-D, such as respective brackets 250A-D for each corresponding inspection device. Alternatively, the visually inspection devices 215A-D may be mounting to the housing 205 via any suitable mounting brackets and/or rails. Indeed, the mounting techniques illustrated in FIGS. 2A-2C are provided by way of non-limiting example only. Further, one or more openings 225A-D or slots may be formed through the housing 205 to permit the visual inspection devices 215A-D to examine an object within the examination area 240. These openings may be similar to those discussed above with reference to the system 100 of FIGS. 1A-1B.

The system 200 may optionally include a wide variety of other components as desired in other embodiments. For example, the system 200 may include one or more transparent protective sleeves (e.g., a quartz tube, etc.), one or more suitable object guides (e.g., wire guides, etc.), any suitable mounting components, one or more suitable ventilation components, and/or any suitable number of computing devices (or controllers). These components may be similar to those described above with reference to FIGS. 1A-1B. As desired, the system 200 may be capable of wired and/or wireless communication with external systems or devices. It will be appreciated that various embodiments of the disclosure may include more or less components than those set forth and described above with reference to FIGS. 2A-2C. Indeed, the illustrated system 200 is provided by way of non-limiting example only.

Figure 3:
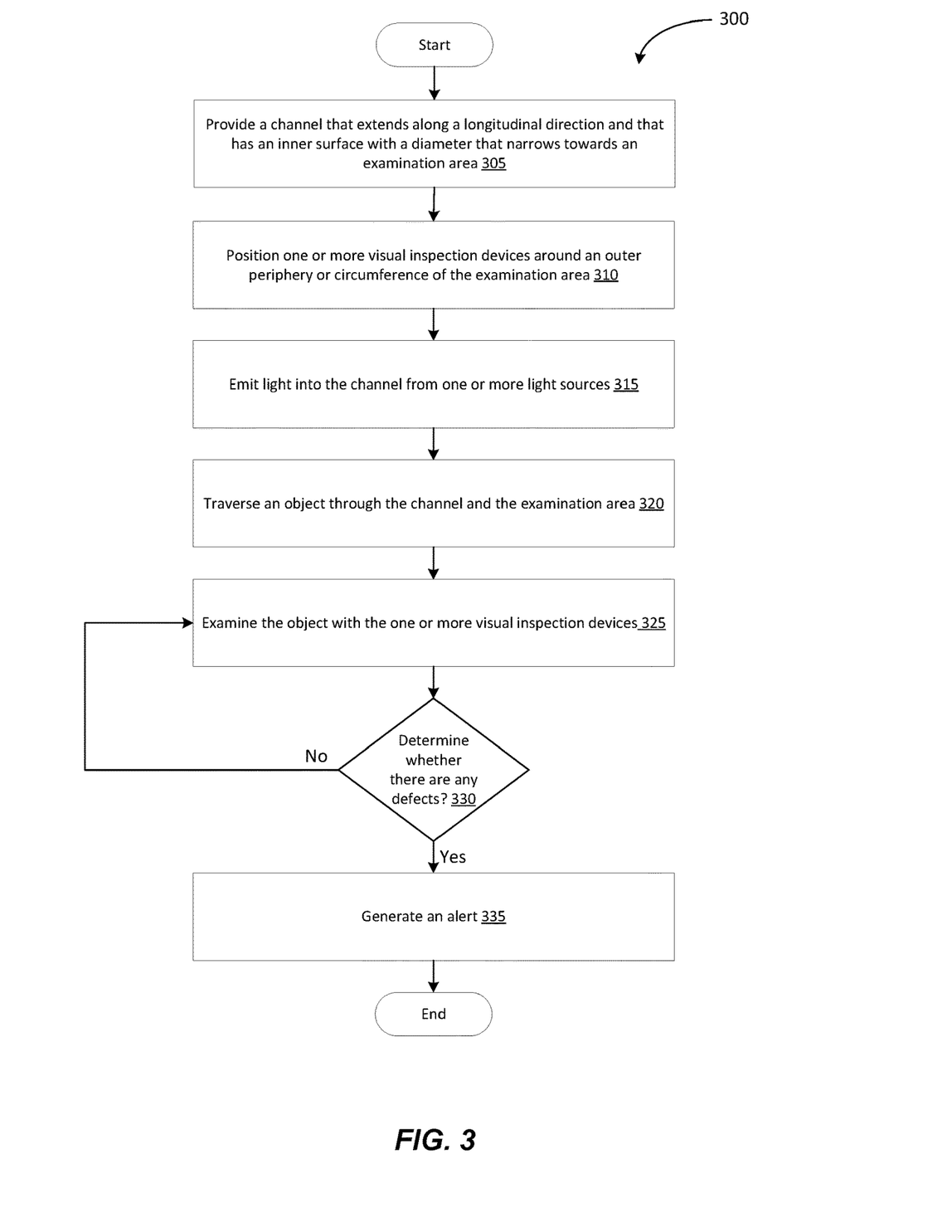
FIG. 3 is a flowchart depicting an example method for examining an object with a contactless visual inspection system, according to an illustrative embodiment of the disclosure.

FIG. 3 is a flowchart depicting an example method 300 for examining an object with a visual inspection system, according to an illustrative embodiment of the disclosure. The method 300 may be performed by and/or utilized in association with a wide variety of visual inspection systems, such as the example systems 100, 200 illustrated in FIGS. 1A-2C and described in greater detail above. The method 300 may begin at block 305 and a suitable visual inspection system may be provided. For example, at block 305, a channel that extends along a longitudinal direction through which an object may be traversed is provided. The channel may include an inner surface having a diameter (or cross-sectional area) that narrows as the channel extends towards an examination area from a light source. For example, if a single light source is utilized, inner surface may narrow along a longitudinal direction from a first point (e.g., a first point positioned between the light source and the examination area) towards the examination area. As another example, if two light sources are utilized and positioned on opposite longitudinal ends of the channel, the inner surface may narrow along a longitudinal direction from a first point (e.g., a first point positioned between a first light source and the examination area) towards the examination area. The inner surface may further narrow along the longitudinal direction from a second point (e.g., a second point positioned between a second light source and the examination area) towards the examination area). The inner surface may narrow at a suitable rate that facilitates focusing of light emitted by one or more light sources onto an object within the examination area. As desired, the inner surface may narrow in accordance with a wide variety of suitable geometric shapes or combination of shapes, such as a convex, parabolic, and/or linear shape. Further, in certain embodiments, the inner surface may constitute a diffuse surface.

At block 310, one or more suitable visual inspection devices (e.g., cameras, etc.) may be positioned around an outer periphery or circumference of the examination area. The visual inspection device may be configured to capture images and/or data from an object as it is traversed through the examination area, and the captured images and/or data may be evaluated and/or otherwise processed in order to determine whether any faults or defects are present on the object. The visual inspection devices may be positioned at a wide variety of suitable locations around the examination area. For example, if four visual inspection devices are utilized, the devices may be positioned approximately 90 degrees apart from one another.

At block 315, light may be emitted into the channel by one or more suitable light sources. In certain embodiments, a single light source may be positioned proximate to one longitudinal end of the channel, and the light source may emit light into the channel. In other embodiments, respective light sources may be positioned proximate to opposite longitudinal ends, and each light source may emit light into the channel. A wide variety of suitable light sources, such as LED ring lights, may be utilized to emit light into the channel.

At block 320, an object may be traversed through the channel and the examination area. For example, an object may be traversed through the channel as it is manufactured or produced within a suitable manufacturing environment. At block 325, the object may be examined by one or more visual inspection devices as it is present within the examination area. For example, the object may be continuously examined in an in-line manner as it passes through the examination area. At block 330, a determination may be made as to whether any faults or defects are identified on or detected on the object. For example, images and/or data captured by the visual inspection device(s) may be evaluated and/or analyzed (e.g., compared to baseline or threshold data) in order to determine whether any faults or defects are present. If it is determined at block 330 that no defects are present, then operations may continue at block 325 and the object may continue to be examined as it is traversed through the examination area.

If, however, it is determined at block 330 that one or more defects are present on the object, then operations may continue at block 335. At block 335, a wide variety of suitable actions may be taken based upon identification or detection of a defect or fault. For example, an alert may be generated. As another example, a defect counter may be incremented for each identified defect and an alert may be triggered if it is determined that a threshold counter has been exceeded (i.e., a threshold counter associated with a minimum number of allowable defects). As yet another example, an amplitude or size of a defect may be determined, and an alert may be triggered if it is determined that the defect size exceeds one or more threshold values. Additionally, as desired in certain embodiments, a determination may be made as to whether continued manufacturing or production of the object wire should be halted (e.g., halted based in part upon determined defect sizes or a detected number of defects). If it is determined that production should not be stopped, then operations may continue at block 325 and the monitoring of the object may continue. If, however, it is determined that production should be stopped, then operations may continue at block 335 and a suitable stop common or alert may be output. The method 300 may end following either block 335 or when the visual inspection devices are powered down.

As desired, the method 300 may include more or less operations than those illustrated in FIG. 3. Additionally, as desired, certain operations of the method 300 may be formed in parallel or in a different order than that set forth in FIG. 3. Indeed, the method 300 is provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A visual inspection system comprising:
   an outer housing comprising a channel through which an object to be inspected is traversed, the channel extending along a longitudinal direction and comprising an inner surface having a diameter that narrows along the longitudinal direction between a first point and an examination area;
   a light source positioned on an opposite side of the first point from the examination area along the longitudinal direction, wherein the inner surface comprises a convex inner surface that facilitates focusing of light emitted by the light source into the examination area; and
   at least one visual inspection device positioned around an outer circumference of the examination area, wherein each visual inspection device is configured to inspect the object through a respective opening in the housing as the object passes through the examination area.

2. The system of claim 1, wherein the light source comprises a ring light.

3. The system of claim 1, wherein each visual inspection device is positioned perpendicular to a longitudinally extending center line of the channel.

4. The system of claim 1, wherein the diameter of the inner surface further narrows along the longitudinal direction between a second point and the examination area, the second point positioned on an opposite side of the examination area from the first point along the longitudinal direction, wherein the light source comprises a first light source, and further comprising:
   a second light source positioned on an opposite side of the second point from the examination area along the longitudinal direction.

5. The system of claim 1, wherein the diameter of the inner surface narrows in a parabolic manner.

6. The system of claim 1, wherein the at least one visual inspection device comprises a camera.

7. The system of claim 1, wherein the at least one visual inspection device comprises a plurality of cameras positioned at spaced locations along the outer circumference of the examination area.

8. The system of claim 1, wherein the inner surface of the channel comprises a diffuse surface that spreads the light emitted by the light source.

9. The system of claim 1, further comprising a transparent sleeve positioned within the channel.

10. The system of claim 9, wherein the transparent sleeve comprises a quartz tube.

11. The system of claim 1, wherein the object comprises a magnet wire.

12. A visual inspection system comprising:
    an outer housing comprising a channel through which an object to be inspected is traversed, the channel extending along a longitudinal direction and comprising an inner surface having a diameter that narrows from opposite ends towards an examination area positioned between the ends;
    a respective light source positioned proximate to each opposite end of the channel, wherein the inner surface comprises a convex inner surface that facilitates focusing of light emitted by the light sources into the examination area;
    at least one visual inspection device positioned around an outer circumference of the examination area, wherein each visual inspection device is configured to inspect the object through a respective opening in the housing as the object passes through the examination area.

13. The system of claim 12, wherein each of the respective light sources comprises a ring light.

14. The system of claim 12, wherein each visual inspection device is positioned perpendicular to a longitudinally extending center line of the channel.

15. The system of claim 12, wherein the diameter of the inner surface narrows in a parabolic manner.

16. The system of claim 12, wherein the at least one visual inspection device comprises a camera.

17. The system of claim 12, wherein the at least one visual inspection device comprises a plurality of cameras positioned at spaced locations along the outer circumference of the examination area.

18. The system of claim 12, wherein the inner surface of the channel comprises a diffuse surface that spreads the light emitted by the respective light sources.

19. The system of claim 12, further comprising a transparent sleeve positioned within the channel.

20. The system of claim 19, wherein the transparent sleeve comprises a quartz tube.

21. The system of claim 12, wherein the object comprises a magnet wire.

* * * * *